United States Patent [19]

Kanada et al.

[11] Patent Number: 4,636,066
[45] Date of Patent: Jan. 13, 1987

[54] METHOD OF EXPOSING PHOTOSENSITIVE MATERIAL

[75] Inventors: Eiji Kanada; Shigeyoshi Suzuki; Kazunaka Endo; Kyonosuke Yamamoto, all of Nagaokakyo, Japan

[73] Assignee: Mitsubishi Paper Mills, Ltd., Tokyo, Japan

[21] Appl. No.: 816,053

[22] Filed: Jan. 3, 1986

[30] Foreign Application Priority Data

Jan. 14, 1985 [JP] Japan .................................. 60-5392
Jan. 14, 1985 [JP] Japan .............................. 60-3841[U]

[51] Int. Cl.$^4$ ............................................. G03B 27/32
[52] U.S. Cl. ...................................... 355/77; 355/71; 355/73
[58] Field of Search ............................ 355/71, 73, 77

[56] References Cited

U.S. PATENT DOCUMENTS

| | | | |
|---|---|---|---|
| 3,249,000 | 5/1966 | Pack | 355/71 X |
| 3,335,636 | 8/1967 | Atkinson | 355/71 X |
| 3,473,873 | 10/1969 | Brackett | 355/71 X |
| 3,593,228 | 7/1971 | Miyauchi | 355/71 X |
| 3,597,077 | 8/1971 | Dorn | 355/71 |
| 3,801,200 | 4/1974 | Nishikawa et al. | 355/71 X |
| 4,012,137 | 3/1977 | Goren | 355/71 X |
| 4,025,189 | 5/1977 | Pugsley | 355/71 X |
| 4,135,813 | 1/1979 | Frank et al. | 355/71 |
| 4,466,735 | 8/1984 | Nelson | 355/71 |

Primary Examiner—Richard A. Wintercorn
Attorney, Agent, or Firm—Cushman, Darby & Cushman

[57] ABSTRACT

There is disclosed a method for exposing in two steps a photosensitive material to an original of a continuous tone image mingled with a line image through a lens of a process camera of the daylight type, which comprises feeding said photosensitive material to an exposure unit disposed in nearly vertical position in said camera and provided with a suction mechanism, and setting the sensitive material in place; (A) in case of the first step exposure being made to an original of a continuous tone image, (a) moving a contact screen from a position in front of the photosensitive material to establish a close contact with the photosensitive material and exposing the sensitive material imagewise to the continuous tone image, subsequently (b-1) moving the contact screen by the internal shift to the position in front of the sensitive material so that it is out of the exposure region while the sensitive material being remained as such, or (b-2) moving the contact screen internally to a position in front of the sensitive material and then shielding the latter against light in such a manner that the sensitive material can be released of the shield at the time of the second step exposure, the contact screen being absent at least in the exposure region at the time of second step exposure and subsequently (c) exposing the sensitive material to the line image (second step exposure), or (B) in case of the first step exposure being made to the line image, (a') exposing the sensitive material to the line image in the first step, then (b'-1) moving the contact screen, which is in front of the sensitive material and kept outside the exposure region, to establish close contact with the sensitive material while the sensitive material being remained as such, or (b'-2) shielding the sensitive material against light in such a manner that the sensitive material can be released of the shield at the time of bringing the contact screen into close contact with the sensitive material and moving the contact screen from a position in front of the sensitive material to establish a close contact with the photosensitive, and subsequently (c') exposing the sensitive material to the continuous tone image (second step exposure).

7 Claims, 1 Drawing Figure

METHOD OF EXPOSING PHOTOSENSITIVE MATERIAL

BACKGROUND OF THE INVENTION

This invention relates to a method of exposing a photosensitive material and, more particularly, to a method of exposing a photosensitive material of the direct lithographic printing plate making type to an original composed of a continuous tone image mingled with a line image by use of a process camera of the daylight type which permits the exposure and associated operation to be carried out in daylight.

At present, a variety of sensitive materials convertible to lithographic printing plates are known and are in actual use. As typical examples, there may be mentioned presentized plates (hereinafter referred to briefly as PS plates) employing diazonium compounds, electrophotographic plates employing zinc oxide or organic conductors, and silver salt photographic plates employing silver halide emulsions. Especially the photosensitive lithographic materials of high sensitivity such as the second and third ones of the above sensitive materials have come into remarkably wide use in the direct making of lithographic printing plates, because such sensitive materials can be treated conveniently and rapidly in an automatic printing plate processor throughout the process beginning with photographing of the original to be printed and including a sequence of processing steps.

Being very high in sensitivity, contrast, and resolving power, the silver salt sensitized material is especially useful. However, although having been imparted with excellent characteristics and improved quality, such sensitized materials are still unsuitable at present for use in the direct making of lithographic printing plates capable of reproducing multicolor prints from a continuous gradation color original such as multicolor photographs. The reasons for this may be many, but one of the most important is a considerably inferior image reproducibility together with an insufficient printing endurance of the directly prepared printing plate as compared with a PS plate. As known well, the PS plate is imparted with a high image-reproducibility through contact printing from an expensive lith film used as an intermediate original, whereas the direct plate making process involves photographing in a camera through a lens, which results an insatisfactory image reproducibility. As described in Japanese Patent Application "Kokai" (Laid-open) No. 89,007/73, the process camera includes a prism or a reflection mirror to obtain a laterally corrected image. Such a prism or mirror is known to exert an influence upon optical characteristics, resulting in deterioration of the image reproducibility. Every process camera now in general use photographs a reflected image. Accordingly, the originals to be photographed are so-called reflection images such as characters and lines (these images are referred to as line images) formed on high-contrast image-forming materials employing an opaque support, such as photographic composing paper sheets or positive paper sheets used in the silver complex diffusion transfer process; or other reflection images such as a halftone dot image transformed from a continuous gradation image, e.g., a photograph. A general practice is to arrange the reflection images according to a predetermined design and use as the finished original (block copy).

When a lithographic printing plate is directly made from a silver salt sensitized plate or electrophotographic plate with a reflection halftone dot image used as orginal, there is reproduced a practically acceptable halftone dot image having a screen ruling of generally 80 or at most 100 lines per inch. Accordingly, even if black and white halftone dot images are prepared by using a panchromatically sensitized continuous gradation film or lith film for color separation and if lithographic printing plates for color printing are prepared by the direct process from said halftone dot images used as original, the resulting printing plates produce a printed color image with unsatisfactory image reproducibility.

In order to solve the above problems, U.S. application Ser. No. 697,569 has proposed a method in which a sensitive material of the lithographic type having a spectrally sensitized panchromatic emulsion layer is brought into direct close contact with a contact screen and exposed through color separation filters. This method comprises placing the sensitive material upon a contact screen disposed on a horizontal transparent platen, then imagewise exposing the underside of the resulting assembly, and manually removing the contact screen from the camera. The sensitive surface tends to get scratched in inserting and removing the contact screen, resulting in scatch fogging and scumming. Such a defect is exaggerated by the presence of a fine powder of several $\mu$m in particle size (e.g. 2 to 10 $\mu$m) which is used to improve the water retention of the constituent layers of sensitive materials for the direct making of lithographic printing plates. In the direct making of multicolor printing plates, a plurality of printing plates such as cyan, magenta, yellow, and black plates must be precisely made, because these plates are used in superimposed impression to obtain a multicolor print; otherwise a print with satisfactory color reproducibility is not obtained from an original of a continuous tone image (e.g. color photograph) mingled with a line image (e.g. letters). In some of the commercially available process cameras of the daylight type such as those described in Japanese Patent Application "Kokai" (Laid-open) Nos. 70,542/81 and 204,032/84, a contact screen fixed in a frame is manipulated to approach a sensitive material fixed to an exposure platen, which is provided with a suction mechanism and disposed in nearly vertical positin, until a close contact is established between them to make them ready for the imagewise exposure. However, since such a process camera is designed to photograph a line image and a continuous tone image on two separate sensitive materials, it is impossible to form in daylight a line image and dot image on the same sensitive material.

SUMMARY OF THE INVENTION

Under the above-mentioned circumstances the present invention has been accomplished.

An object of this invention is to provide a method of exposure which comprises using a reproduction camera which enables the mounting and demounting of a contact screen to be performed under daylight by simple manipulation, while the scratch fogging of the sensitive material and the damage of the contact screen being prevented, and forming on a single sensitive material images reproduced from an original of a continuous tone image mingled with a line image.

Another object of this invention is to provide a method of producing a lithographic printing plate having a high resolution and a high printing endurance, especially a method for the direct making of multicolor printing plates having excellent color reproducibility.

A further object of this invention is to provide a compact-type reproduction camera.

DETAILED DESCRIPTION OF THE INVENTION

Figure 1:
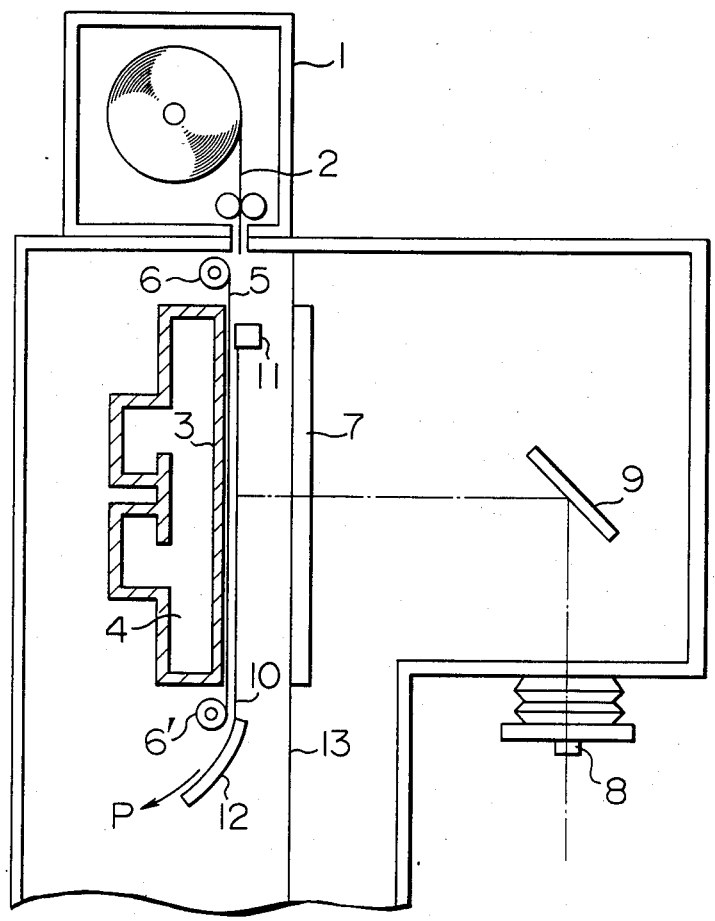
FIG. 1 is a sectional view of the main part illustrating an example of process cameras of the daylight type used in carrying out the method of the present invention.

The object of this invention can be achieved by a method for the two-step imagewise exposure of a sensitive material through a lens of a daylight camera to an original of a continuous tone image mingled with a line image. This method comprises feeding said photosensitive material to an exposure unit disposed in nearly vertical position in said camera and provided with a suction mechanism and setting the sensitive material in place; then, (A) in case of the first step exposure being to an original of a continuous tone image (a) moving a contact screen from a position in front of the photosensitive material to establish a close contact with the photosensitive material and exposing the sensitive material imagewise to the continuous tone image, subsequently (b-1) moving the contact screen by the internal shift to the position in front of the sensitive material so that it is out of the exposure region while the sensitive material being remained as such, or (b-2) shifting the contact screen internally to a position in front of the sensitive material, and then shielding the latter against light in such a manner that the sensitive material can be released of the shield at the time of the second step exposure, the contact screen being absent at least in the exposure region at the time of second step exposure and subsequently (c) exposing the sensitive material to the line image (second step exposure), or (B) in case of the first step exposure being to the line image, (a') exposing the sensitive material to the line image in the first step, then (b'-1) moving the contact screen, which is in front of the sensitive material and kept outside the exposure region, to establish close contact with the sensitive material while the sensitive material being remained as such, or (b'-2) shielding the sensitive material against light in such a manner that the sensitive material can be released of the shield at the time of bringing the contact screen into close contact with the sensitive material and moving the contact screen from a position in front of the sensitive material to establish a close contact with the photosensitive material, and subsequently (c') exposing the sensitive material to the continuous tone image (second step exposure). Further, the objects of this invention can be achieved more favorably by using a shielding sheet movable both upward or downward in shielding against light the sensitive material set in place in the exposure unit.

The invention is further illustrated in detail below with reference to FIG. 1 which represents an example of process cameras suitable for use in the method of this invention.

The term "the position in front of the photosensitive material", as herein used, pertains to the relative position of the contact screen to the sensitive material just before the close contact is established between them, which will not give rise to sliding contact. When the contact screen is in the position as shown in FIG. 1, the contact takes place by simple horizontal shift of the contact screen. However, the contact screen can be positioned at a distance from the sensitive material above or below the sensitive material or at the right or left side of it.

The term "internal moving", as herein used, means the movement inside the camera without being exposed to daylight.

Both the first step exposure and the second step exposure are main exposures. If necessary, auxiliary exposure such as flash, highlight, or backside exposure may be used in addition to the main exposure.

EXAMPLE

FIG. 1 shows the main part of an example of the process cameras suitable for carrying out the method of this invention for the direct making of a printing plate by use of a sensitive material of the lithographic type. In FIG. 1, the dimensions and relative positions of each element are exaggerated to assist better comprehension.

In carrying out the present method for the direct making of multicolor lithographic printing plates, at first a sensitive material 2 of the lithographic type is prepared as shown below.

Preparation of Sensitive Material of the Lithographic Type:

A gelatino silver chlorobromide emulsion containing 3 mole-% of silver bromide is prepared in a customary manner. The silver halide is 0.4 μm in average particle size. After chemical sensitization, the emulsion is panchromatically sensitized by the addition of the following dyes No. 1, 2, and 3. A coating composition is prepared from the sensitized emulsion by adding a stabilizer, hardener, and coating aid.

Dye No. 1: 90 mg per mole of silver halide.

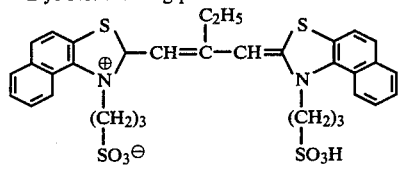

Dye No. 2: 700 mg per mole of silver halide.

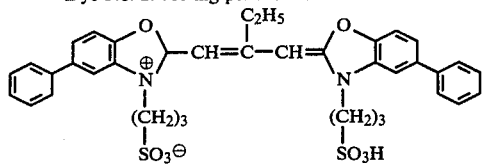

Dye No. 3: 500 mg per mole of silver halide.

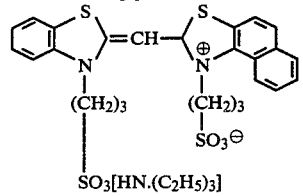

An antihalation layer of carbon black containing silica particles of 7 μm in average particle size, hydroquinone, and phenidone is provided on a subbed polyester film of 100 μm in thickness. The coating composition above prepared is coated on the antihalation layer to form an emulsion layer at a silver coverage of 15 g/m² in terms of silver nitrate. A physical development nuclei layer containing palladium sulfide is provided on the emulsion layer to obtain a sensitive material 2 of the lithographic type.

The sensitive material 2 is held in the form of roll in magazine 1 and a predetermined length of it is fed to the exposure section composed of a suction pump 4 and a perforated photographing platen 3. The platen is disposed in vertical position or, in certain cases, in inclined position, the inclination being at most about 20 degrees to the vertical. The transfer of sensitive material 2 is controlled by the movement of perforated belt 5 to which the former adheres by applied suction. The perforated belt 5 can reciprocate in contact with platen 3 by the revolution of reversible rollers 6 and 6'. The conveyance of sensitive materials by means of a perforated belt is also disclosed, for example, in Japanese Patent Application "Kokai" (Laid-open) Nos. 70,542/81 and 204,032/84. The camera used in the present invention can be designed so as to move the sensitive material 2 in the upward direction as disclosed in the latter Patent Application.

Below the lens 8 in FIG. 1, there is provided a horizontal rack (not shown) for an original. It is preferable to provide both the transmission and reflection exposure units. The transmitted light through or reflected light from the original (not shown) travels through lens 8, then right and left reversed by mirror 9, and reaches sensitive material 2 held in place by means of platen 3 and perforated belt 5. In front of or in the rear of lens 8, there is provided a color separation filter holder and each filter can be brought in proper position by means of a rotary mechanism.

After completion of all exposures, the sensitive material 2 is sent, by the movement of perforated belt 5 and along a guide plate 12, to a pair of convey rollers (not shown) and then to a processor unit (P) provided with a developing tank and, if necessary, neutralizing tank, desensitizing tank, and so on, thereby to complete the printing plate making.

The procedure is illustrated in detail below.

A predetermined length of sensitive material is cut either manually or automatically by means of a movable rotary cutter (not shown) disposed at or near the delivery port of cassette 1, then sent to the exposure section, and set in predetermined position. The cutting of sensitive material 2 can be performed after completion of predetermined exposures. An original bearing a continuous tone multicolor photograph and letters in black is placed on the original rack. The heading letters A, B and C are to be printed in red, green, and black, respectively. In the present Example, sensitive materials for yellow, magenta, cyan, and black plates are each exposed in the first step to the continuous tone multicolor photograph and in the second step to the letter under the following conditions.

| Plate | Exposure | Original | Color filter, Ratten No. | Et (sec.) | f (sec.) |
|---|---|---|---|---|---|
| Cyan | ① | Photograph | No. 25 | 25 | 3.7 |
| | ② | Letter B | " | 3.3 | — |
| Magenta | ① | Photograph | No. 58 | 30 | 3.6 |
| | ② | Letter A | " | 4 | — |
| Yellow | ① | Photograph | No. 47B | 112 | 3 |
| | ② | Letter A | " | 7 | — |
| | ② | Letter B | " | 7 | — |
| Black | ① | Photograph | No. 85B | 60 | 3 |
| | ② | Letter C | " | 3.5 | — |

It is necessary to mask the letter in the original in the first step exposure and to mask the photograph as well as unnecessary letters in the second step exposure. In the above table, ① means exposure through the contact screen and ② means exposure without using the contact screen. In the case of photograph original, a flash exposure (f in second) was used in addition to a main exposure (Et in second). The exposure was performed at a stop f=16. The contact screen employed was GCDN (150 lines/in) of Dainippon Screen Co. The screen angles were varied as follows: 15° for cyan plate, 45° for magenta plate, 0° for yellow plate and 75° for black plate.

Before feeding the sensitive material 2 to the exposure section, the contact screen fixed to a frame which holds it is detached at 13 and is mounted on a rack 7 under daylight. After the sensitive material 2 has been set in place, the contact screen rack 7 is manipulated by an electric means outside the camera so that the rack may horizontally approach the sensitive material 2 until the contact screen comes in close contact with the latter, thus making it ready for the first step exposure. The rack 7 can approach the sensitive material 2 not only by the horizontal displacement from its rest position in front of the sensitive material 2 as shown in FIG. 1 but also from various rest positions outside the exposure region (above or below the exposure region or at the right or left of it) by moving either via the position shown in FIG. 1 or directly, provided that the contact screen comes in close contact with the sensitive material 2 by the horizontal movement.

Such an arrangement of the rest position of rack 7 outside the exposure region makes possible the succeeding second step exposure to be made in a daylight condition in the following way: After completion of the first step exposure through the contact screen and before the second step exposure to letter images in the original, the contact screen rack 7 is returned to the initial rest position outside the exposure region while the sensitive material 2 remains adhered to the exposure section by suction, making it ready for the second step exposure. It is of course possible to find a way of removing, under daylight, the contact screen from the camera.

Another way of exposing, in the second step, the sensitive material to the letter original is to return, by the horizontal shift, the contact screen rack 7 to its intial position shown in FIG. 1 and then to shield the sensitive material against light (it is of course possible to return the rack 7 to its intial position situated outside the exposure region). The shield must be removed before execution of the second step exposure to a letter image. For this reason, the shielding sheet 10 should be movable in both upward and downward directions. A suitable way to meet such a requirement consists in fixing one end of the shielding sheet held in a holder 11 to the guide plate 12, which guides the exposed sensitive material 2 to processor P, and to pull the holder 11 upward by means of a chain (not shown) fixed to the holder and driven by some means which can be operated from the outside of the camera, thereby to unroll the shielding sheet 10 wound around a roller in the holder 11 so that the sheet may cover and adhere to the sensitive material 2 by suction. Such a way of shielding the sensitive material or the above-mentioned removal of contact screen rack 7 from the exposure region is useful in the direct making of multicolor printing plates, because the sensitive material 2 remains adhered to the platen 3 through the interposed perforated belt until all exposures have been completed. The roller in the shielding sheet holder 11 is provided with a spring mechanism so that the shielding sheet may be wound back into the holder when the sheet is released from the tension by the descent of the holder 11. When suitably designed, the shielding can be performed also by the ascent or lateral shift of the holder or by manual manipulation from the outside.

The shielding of the sensitive material 2 can be performed in still another way by providing a dark box above the exposure section, which delivers or brings back through a pair of reversible rollers; the exposed sensitive material 2 is brought back, by the upward movement of perforated belt 5, into said dark box to be shielded against light after the first step exposure and the mounting and demounting of contact screen have been completed.

In the camera shown in FIG. 1, after the exposed sensitive material 2 has been shielded against light, the contact screen rack 7 is separated at the position 13 and the contact screen frame is removed under daylight. After the rack has returned to the initial state, the sensitive material 2 is released of the shielding sheet 10 by the descent of holder 11 and the second step exposure is performed.

In the foregoing, detailed description is given with respect to the case where the first step exposure is made to a continuous tone multicolor photograph and the second step exposure is made to a letter image. The procedure in the reverse case should be apparent from the above description and, accordingly, the description with respect to this case is omitted.

The exposed sensitive materials for color plates are then sent to a processor (P) to be processed. The following processing solutions are employed.

| Transfer developer: | |
| --- | --- |
| Water | 700 ml |
| Potassium hydroxide | 20 g |
| Sodium sulfite, anhydrous | 50 g |
| 2-Mercaptobenzoic acid | 1.5 g |
| 2-Methylaminoethanol | 15 g |
| Made up with water to | 1 liter |
| Neutralizer | |
| Water | 600 ml |
| Citric acid | 10 g |
| Sodium citrate | 35 g |
| Colloidal silica (20% solution) | 5 ml |
| Ethylene glycol | 5 ml |
| Made up with water to | 1 liter |
| Desensitizer | |
| Water | 600 ml |
| Isopropyl alcohol | 400 ml |
| Ethylene glycol | 50 g |
| 3-Mercapto-4-acetamido-5-n-heptyl-1,2,4-triazole | 1 g |

Superimposed impressions were made using the lithographic printing plates obtained as described above and the inks in corresponding colors. The prints showed excellent reproducibility of the multicolor original and, of course, of the letter original, the dot area being in a wide range of from 5% to 95%. The printing endurance was 5,000 or more copies which showed neither scumming nor fogging. The contact screen showed no damage even after many printing plates have been made.

It would be understandable that the method of this inventin is especially suited for the direct making of multicolor printing plates and can also be adaptable to the sensitive materials used in the direct making of lithographic printing plates for black and white printing or in making a block copy.

What is claimed is:

1. A method for exposing in two steps a photosensitive material to an original of a continuous tone image mingled with a line image through a lens of a process camera of the daylight type, which comprises feeding said photosensitive material to an exposure unit disposed in nearly vertical position in said camera and provided with a suction mechanism, setting the sensitive material in place; then, (A) in case of the first step exposure being made to an original of a continuous tone image, (a) moving a contact screen from a position in front of the photosensitive material to establish a close contact with the photosensitive material and exposing the sensitive material imagewise to the continuous tone image, subsequently (b-1) moving the contact screen by the internal shift to the position in front of the sensitive material so that it is out of the exposure region while the sensitive material being remained as such, or (b-2) moving the contact screen internally to a position in front of the sensitive material and then shielding the latter against light in such a manner that the sensitive material can be released of the shield at the time of the second step exposure, the contact screen being absent at least in the exposure region at the time of second step exposure and subsequently (c) exposing the sensitive material to the line image (second step exposure), or (B) in case of the first step exposure being made to the line image, (a') exposing the sensitive material to the line image in the first step, then (b'-1) moving the contact screen, which is in front of the sensitive material and kept outside the exposure region, to establish close contact with the sensitive material while the sensitive material being remained as such, or (b'-2) shielding the sensitive material against light in such a manner that the sensitive material can be released of the shield at the time of bringing the contact screen into close contact with the sensitive material and moving the contact screen from a position in front of the sensitive material to establish a close contact with the photosensitive, and subsequently (c') exposing the sensitive material to the continuous tone image (second step exposure).

2. A method of exposure according to claim 1, wherein the shielding against light is effected by means of a shielding sheet movable upward and downward.

3. A method of exposure according to claim 1, wherein the sensitive material is a sensitive material of the lithographic type.

4. A method of exposure according to claim 3, wherein the sensitive material of the lithographic type is panchromatically sensitized.

5. A method of exposure according to claim 1, wherein the sensitive material is exposed to a reflected light through an image reversing mechanism.

6. A method of exposure according to claim 3, wherein the sensitive material of the lithographic type has at least a silver halide emulsion layer and a surface layer containing physical development nuclei provided on a support.

7. A method of printing by the use of the printing plate prepared according to claim 1.

* * * * *